(12) United States Patent
Singhal et al.

(10) Patent No.: US 12,522,248 B2
(45) Date of Patent: Jan. 13, 2026

(54) SELECTING A VEHICLE ACTION BASED ON A COMBINATION OF VEHICLE ACTION INTENTS

(71) Applicant: Motional AD LLC, Boston, MA (US)

(72) Inventors: Puneet Singhal, Pittsburgh, PA (US);
Yash Trikannad, Pittsburgh, PA (US);
Shih-Yuan Liu, Arlington, MA (US);
Qianli Ma, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 399 days.

(21) Appl. No.: 18/149,133

(22) Filed: Jan. 2, 2023

(65) Prior Publication Data

US 2024/0124029 A1    Apr. 18, 2024

Related U.S. Application Data

(60) Provisional application No. 63/379,549, filed on Oct. 14, 2022.

(51) Int. Cl.
*B60W 30/18*    (2012.01)
*B60W 60/00*    (2020.01)

(52) U.S. Cl.
CPC .. *B60W 60/0027* (2020.02); *B60W 30/18163* (2013.01); *B60W 2552/10* (2020.02);
(Continued)

(58) Field of Classification Search
CPC ....... B60W 60/0027; B60W 30/18163; B60W 2552/10; B60W 2554/4045; B60W 2554/802; B60W 2552/53; B60W 60/0011

See application file for complete search history.

(56) References Cited

U.S. PATENT DOCUMENTS 11,199,841 B1 * 12/2021 Van Den Berg ... G01C 21/3658
11,654,902 B1 *  5/2023 Dingli ................... B60W 40/12
                                                                701/93

(Continued)

FOREIGN PATENT DOCUMENTS

KR    10-2018-0096114 A    8/2018

OTHER PUBLICATIONS

Gu, X. et al., "A Novel Lane-Changing Decision Model for Autonomous Vehicles Based on Deep Autoencoder Network and XGBoost", IEEE Access, Jan. 2020, vol. 8, pp. 9846-9863. doi: 10.1109/ACCESS.2020.2964294.

(Continued)

*Primary Examiner* — Ashley L Redhead, Jr.
(74) *Attorney, Agent, or Firm* — Knobbe, Martens, Olson & Bear, LLP

(57) ABSTRACT

Provided are methods and systems for lane change and intent determination. A method for operating an autonomous vehicle is provided. The method includes obtaining, first scene data associated with a scene of an autonomous vehicle. The method includes generating a plurality of trajectories for the autonomous vehicle. The method includes selecting a trajectory from the plurality of trajectories. The method includes determining a vehicle action intent of the selected trajectory. The method includes combining the vehicle action intent of the selected trajectory with a set of vehicle action intents to form a plurality of vehicle action intents. The set of vehicle action intents correspond to a set of trajectories generated prior to the selected trajectory from second scene data. The method includes selecting a vehicle action for the autonomous vehicle and causing the autonomous vehicle to initiate performance of the vehicle action based on the selecting the action.

19 Claims, 12 Drawing Sheets

(52) U.S. Cl.
CPC .............. *B60W 2554/4045* (2020.02); *B60W 2554/802* (2020.02)

(56) References Cited

U.S. PATENT DOCUMENTS

| | | | | |
|---|---|---|---|---|
| 2018/0237027 | A1* | 8/2018 | Lundsgaard | G01M 17/007 |
| 2018/0239358 | A1* | 8/2018 | Choi | B60W 30/095 |
| 2021/0107566 | A1* | 4/2021 | Seegmiller | H04W 4/02 |
| 2021/0276561 | A1* | 9/2021 | Hayakawa | B60W 30/0956 |
| 2022/0105961 | A1* | 4/2022 | Wang | G06V 20/56 |
| 2022/0169278 | A1* | 6/2022 | Refaat | G06F 18/214 |
| 2022/0348225 | A1* | 11/2022 | Kumano | B60W 60/0015 |
| 2022/0348227 | A1* | 11/2022 | Foster | B60Q 1/507 |
| 2022/0365530 | A1* | 11/2022 | Foster | B60W 60/0015 |
| 2022/0383741 | A1* | 12/2022 | Sanchez | G06F 1/163 |
| 2023/0067887 | A1* | 3/2023 | Garg | B60W 60/001 |

OTHER PUBLICATIONS

Invitation to Pay Additional Fees and Partial International Search Report received for PCT Application No. PCT/US2023/075791, mailed Jan. 4, 2024.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
International Preliminary Report received for PCT Application No. PCT/US2023/075791, mailed Apr. 24, 2025.
International Search Report and Written Opinion received for PCT Application No. PCT/US2023/075791, mailed Feb. 29, 2024.

* cited by examiner

SELECTING A VEHICLE ACTION BASED ON A COMBINATION OF VEHICLE ACTION INTENTS

CROSS-REFERENCE TO RELATED APPLICATION

The present application claims priority to U.S. Patent Application No. 63/379,549, filed Oct. 14, 2022, entitled SELECTING A VEHICLE ACTION BASED ON A COMBINATION OF VEHICLE ACTION INTENTS, which is incorporated herein by reference in its entirety.

BACKGROUND

Autonomous vehicles can use a number of methods and systems for determining and implementing a trajectory for the autonomous vehicle. However, these methods and systems can cause instability in lane change scenarios due to changing conditions in projected trajectories. Further, these methods and systems may not allow for sufficient time to warn surrounding traffic of a potential lane change.

DETAILED DESCRIPTION

Figure 1:
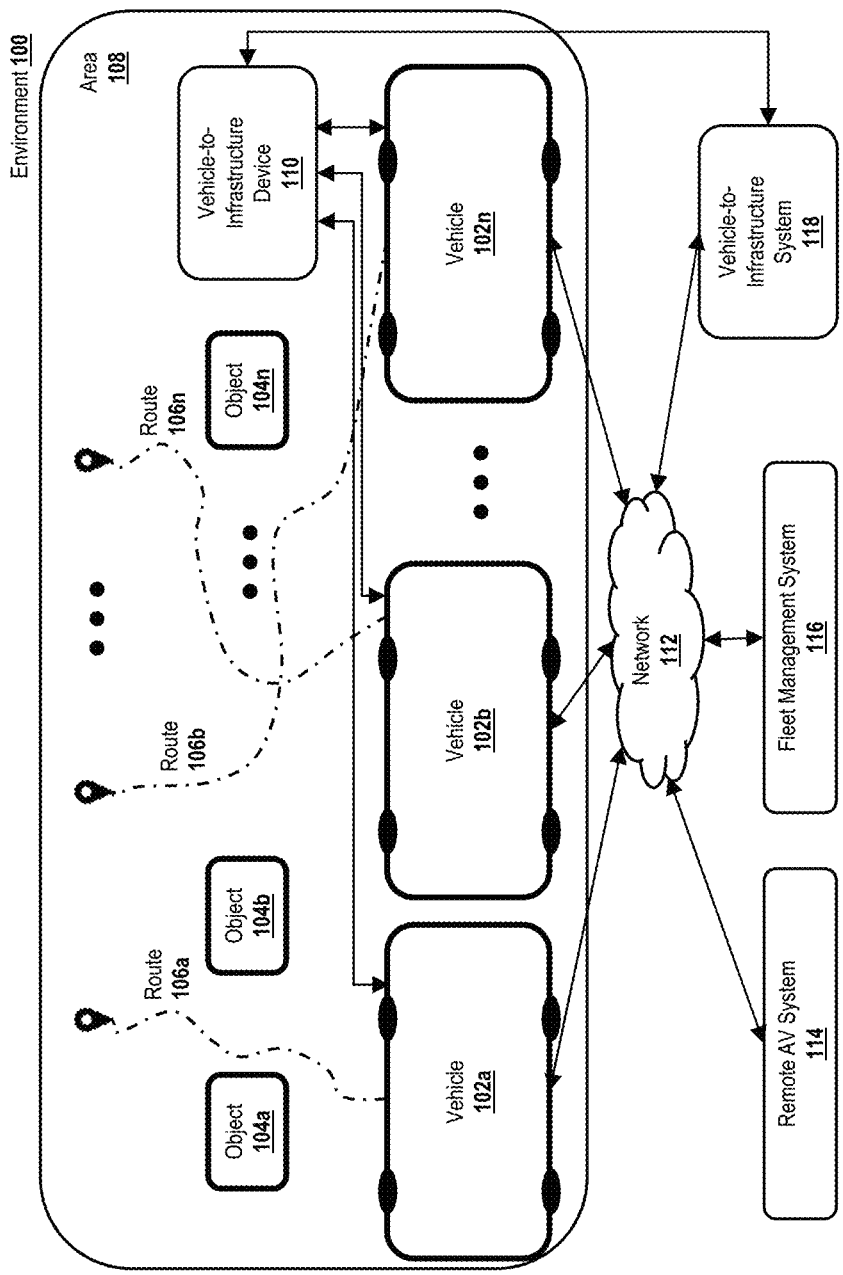
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a lane change system. Automated changes in trajectory for autonomous vehicles can be prone to instability due to changing conditions in projected trajectories. For example, the autonomous vehicle 200 may determine that a lane change trajectory is safe at a given time and initiate a lane change. Another vehicle may obstruct the lane change trajectory before the autonomous vehicle completes the lane change, causing the autonomous vehicle to abort the lane change. As such, the autonomous vehicle may fluctuate between the determination that the lane change is safe and a determination that the lane change is unsafe. In some examples, the autonomous vehicle initiates certain actions based on the determination that a lane change is safe, and initiates other actions based on the determination that the lane change is unsafe. As such, the changes in trajectory may be unstable due to conflicting actions initiated based on alternating determinations of a safe lane change and an unsafe lane change. In some examples, the lane change trajectory instability may also cause the autonomous vehicle to maintain a lane change attempt and abort loop, which can be unwanted for passengers (e.g., uncomfortable and/or unsafe).

However, the autonomous vehicle can follow more stable lane change trajectories and avoid lane change attempt and abort loops by obtaining confirmation of intent to change lanes over a period of time. By obtaining such confirmation, the system can determine and verify stable lane change conditions (e.g., conditions where an agent is not repeatedly arriving in and retreating from the vehicle lane change trajectory).

To address the issues of lane change trajectory instability and lane change attempt and abort loops, a system may obtain multiple confirmations of intent to change trajectories over time, before initiating action to change lanes. In some examples which will be described in further detail below, an autonomous vehicle can determine an initial intent to change lanes and initiate a lane change sequence. The autonomous vehicle can then maintain its current trajectory over a period of time (e.g., a waiting period), as the vehicle continues to determine confirmatory trajectory intents over time. In some cases, the vehicle can determine to initiate an action to change trajectories if a satisfactory ratio of intent determinations confirm the intent to change trajectories. For example, the autonomous vehicle can scan an adjacent lane for a clear trajectory to change lanes. The vehicle can determine an intent to change lanes based on an indication that a lane change trajectory is clear. The autonomous vehicle can maintain its trajectory in its initial lane for a set period of time while the autonomous vehicle continues to scan the adjacent lane for the set period of time. The autonomous vehicle can then determine that it has obtained more indications that the lane change trajectory is clear (and intent to change lanes), than indications that the lane change trajectory is not clear (and intent to maintain position) over the set period of time. The autonomous vehicle can then initiate a lane change along the lane change trajectory.

In certain cases, the vehicle may determine that an alternative trajectory is not clear. In such cases, the autonomous vehicle can maintain its initial trajectory and re-initiate the process to determine whether it should change trajectories. By virtue of the implementation of systems, methods, and computer program products described herein, techniques for lane change provide stabilized lane change routines. Techniques for lane change as described herein further provide routines that cause the vehicle to operate using reduced compute resources to address sudden vehicle movements in situations where lane changes are not appropriate. The techniques disclosed herein further provide smoother vehicle operation and increased comfort and safety during lane changes.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
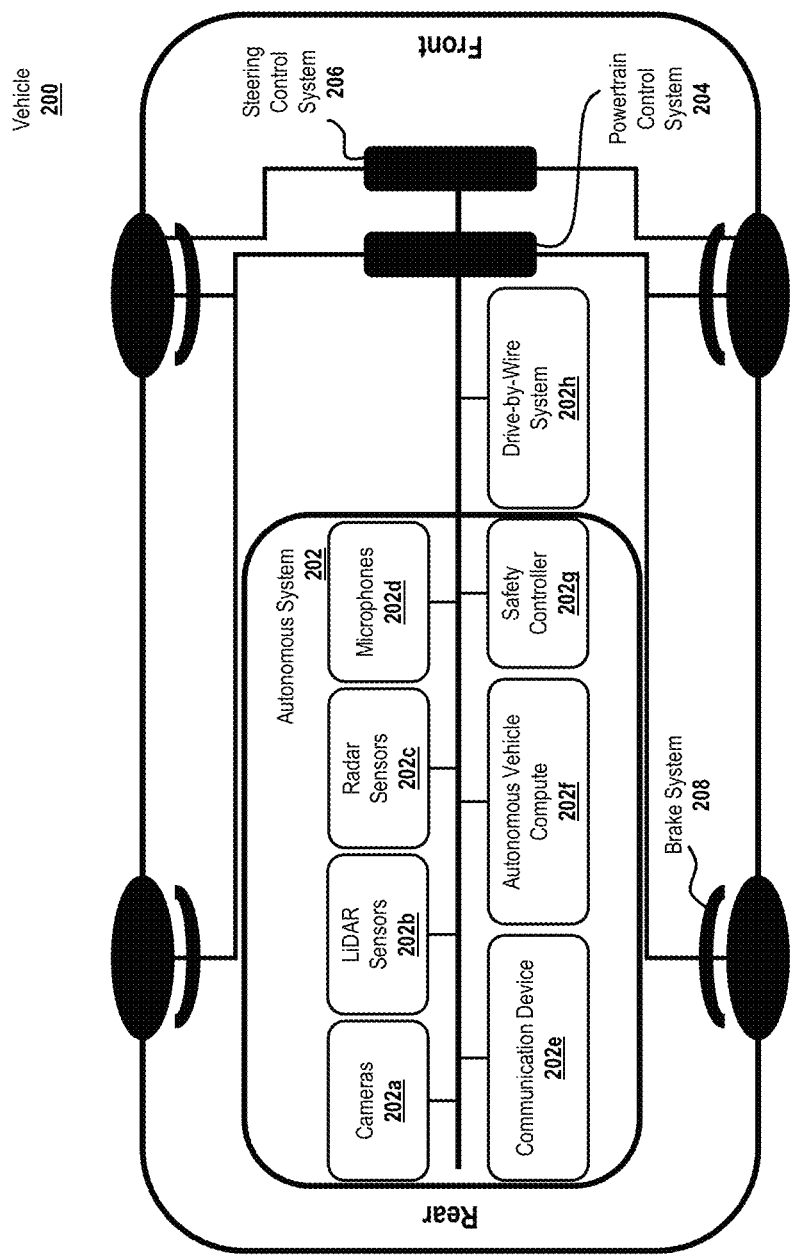
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
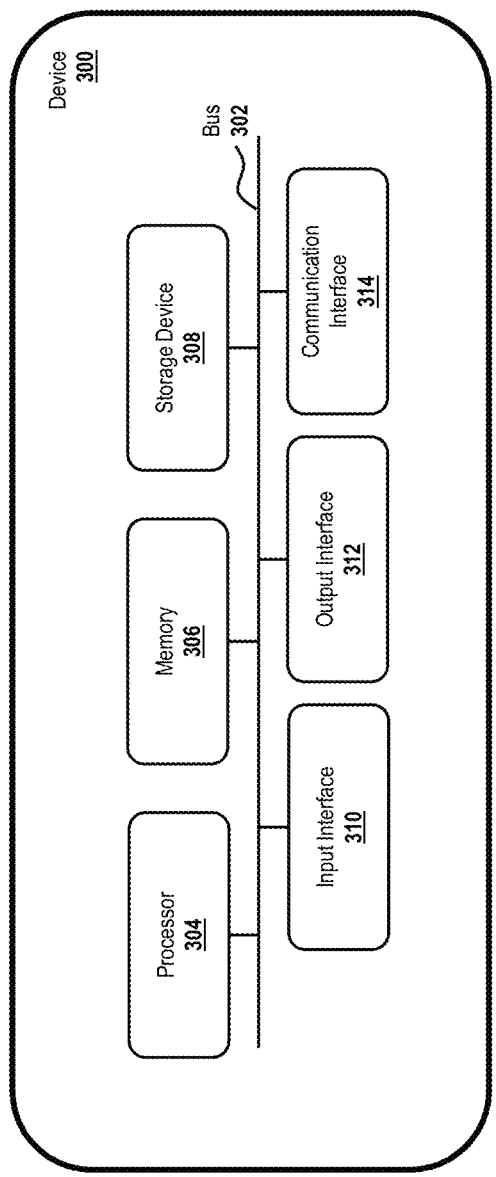
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a C harge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, the processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi© interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
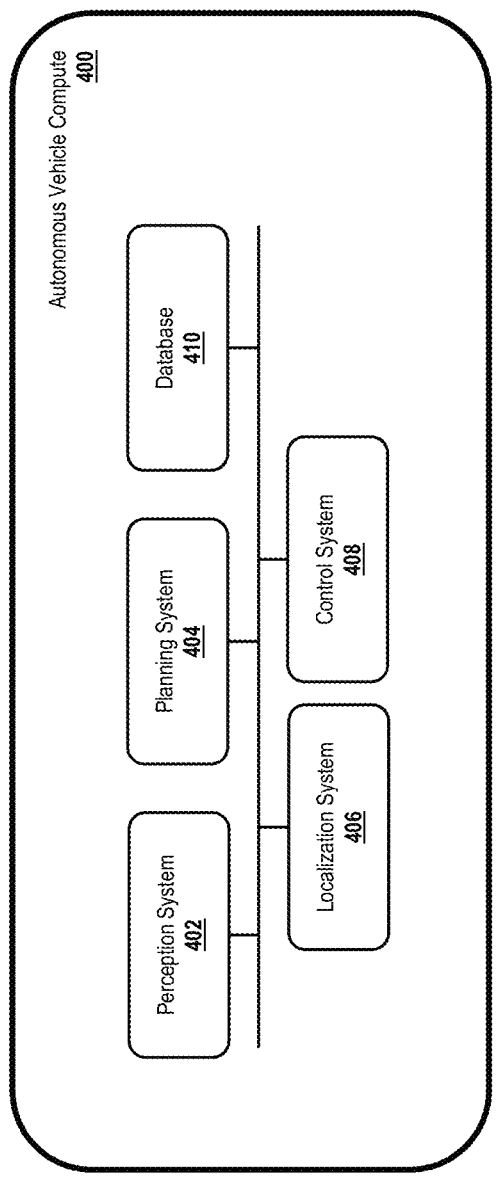
FIG. 4A is a diagram of certain components of an autonomous system.
Figure 4B:
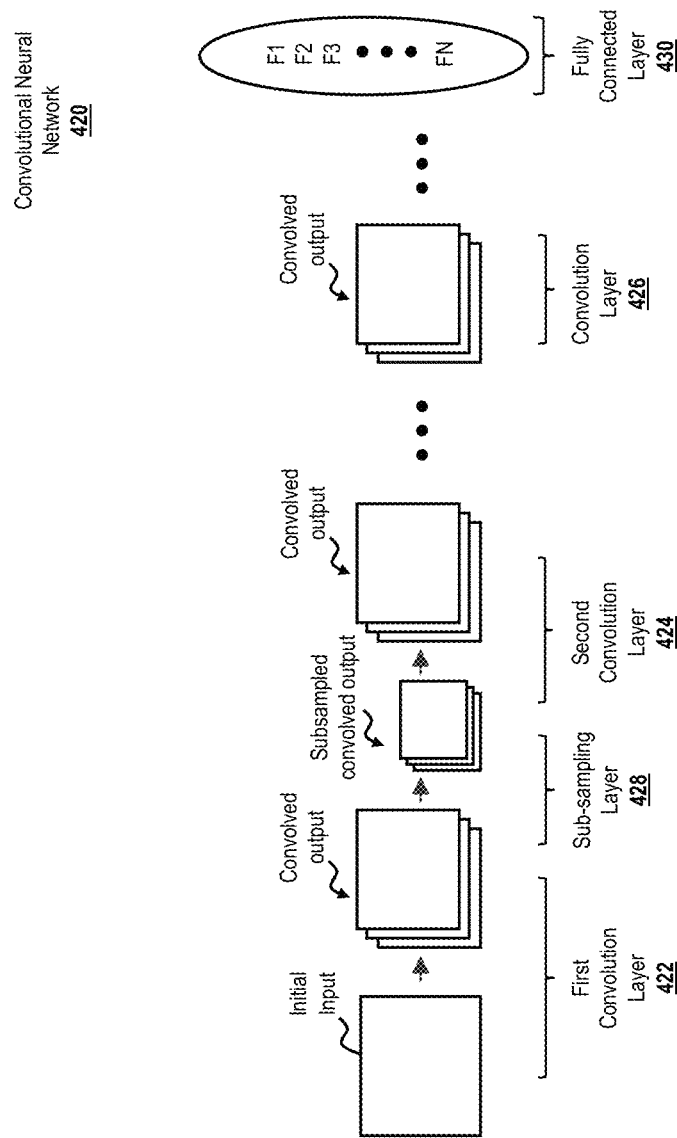
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations.

Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 4 02 normalizing sensor data (e.g., image data, LiDAR data, radar data, and/or the like).

In some embodiments, CNN 420 generates an output based on perception system 4 02 performing convolution operations associated with each convolution layer. In some examples, CNN 420 generates an output based on perception system 4 02 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 43 0 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
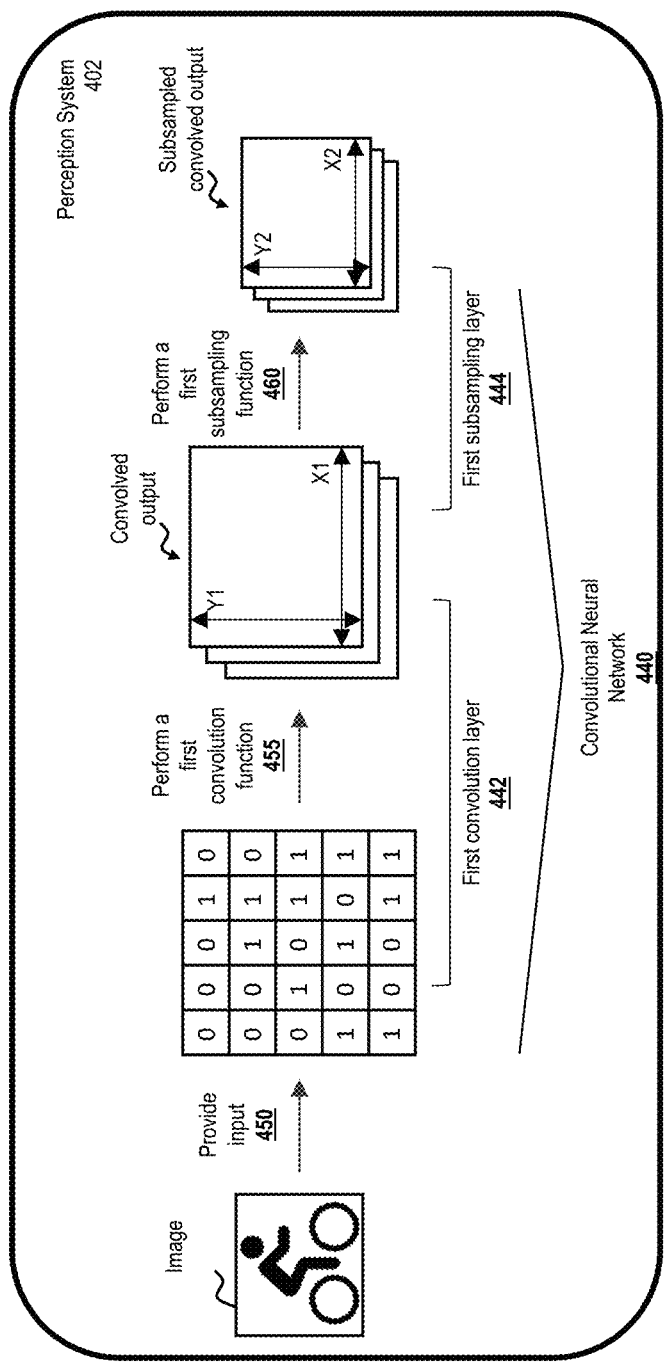
FIGS. 4C and 4D are a diagram illustrating example operation of a CNN.
Figure 4D:
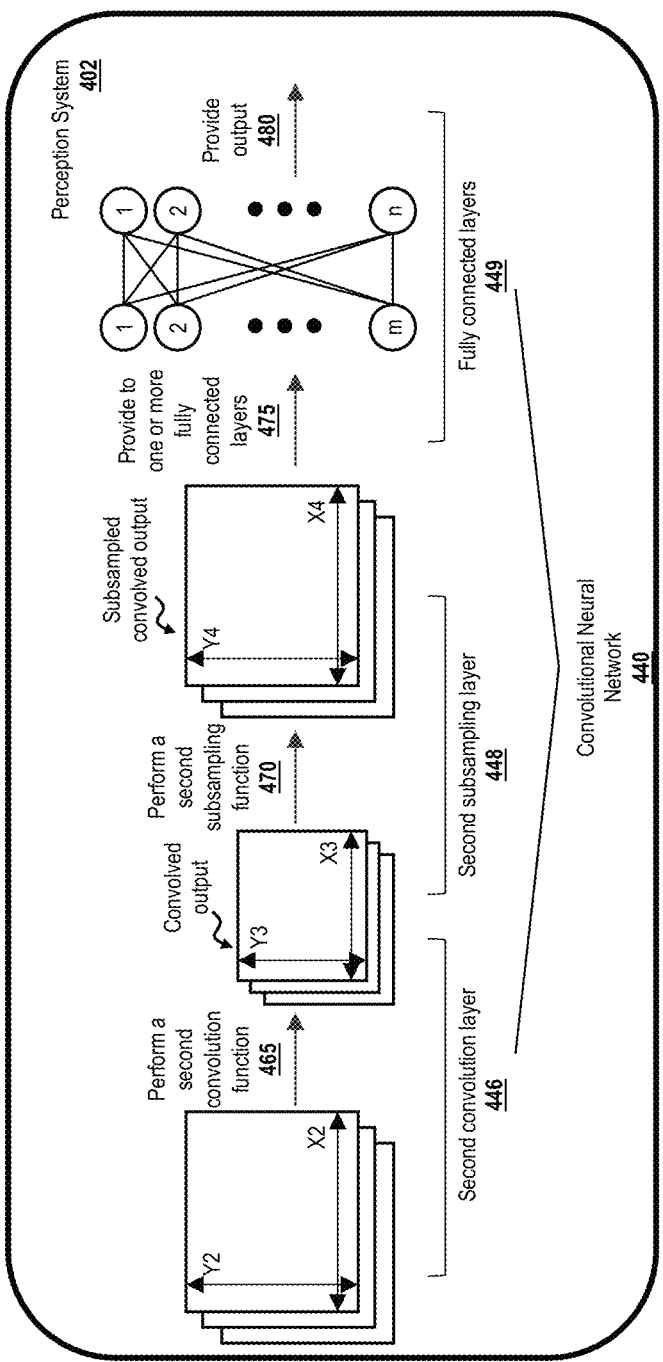

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Lane changing can be prone to instabilities due to inconsistent conditions within a lane change trajectory. For example, if an autonomous vehicle receives an indication of an intent to change lanes and the autonomous vehicle determines that a lane is clear, the autonomous vehicle may initiate a lane change. However, in some instances an agent, such as another vehicle, can enter the lane change trajectory after the autonomous vehicle has initiated the lane change, but before the autonomous vehicle has completed the lane change. In some such instances, the autonomous vehicle can determine detect undesirable lane change conditions (e.g., unsafe/uncomfortable lane change conditions). The planning system 404 can determine not to change lanes due to the undesirable lane change conditions. In some instances, the planning system can determine that the lane change trajectory is desirable based on data received from the perception system 402 after the undesirable lane change conditions are determined. As such, the vehicle can determine to change lanes due to safe lane change conditions. Because road way conditions can change fluidly, in some examples, the roadway conditions fluctuate such that the planning system 404 continuously fluctuates between a lane change indication and a maintain lane indication. This fluctuation between a lane change indication and a maintain lane indication can cause uncomfortable and/or unsafe conditions for passengers of the autonomous vehicle 200 and vehicles surrounding the autonomous vehicle 200. As such, an intent determination system and/or a lane change system can be used to provide a desired level of roadway condition certainty prior to physically initiating a lane change.

Lane Change System

Figure 5:
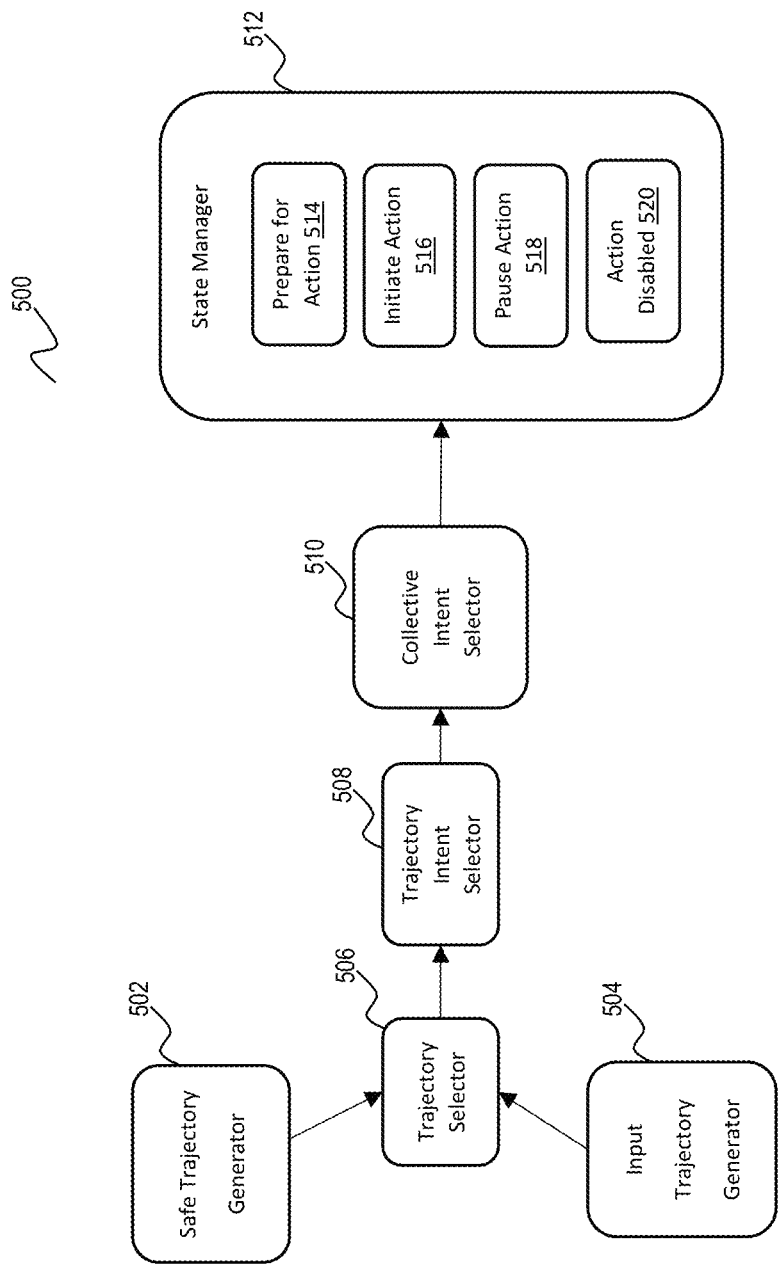
FIG. 5 is a block diagram illustrating an example of a lane change system.

FIG. 5 is a block diagram illustrating an example of a lane change system 500. The lane change system 500 can be a subsystem of the planning system 404, and can provide a mechanism for the autonomous vehicle 200 to confirm an intended action for the autonomous vehicle 200 to take. The lane change system 500 can provide confirmation of a vehicle action intent for the autonomous vehicle 200 and increase trajectory determination stability. The lane change system 500 can further receive and validate vehicle trajectory options to determine whether to initiate and/or terminate operational states within the planning system 404.

In the example shown in FIG. 5, the lane change system 500 includes a safe trajectory generator 502, an input trajectory generator 504, a trajectory selector 506, a trajectory intent selector 508, a collective intent selector 510, and a state manager 512. The trajectory selector 506 can receive data associated with trajectories generated by the safe trajectory generator 502 and/or the input trajectory generator 504. The trajectory intent selector 508 can receive data associated with a selected trajectory from the trajectory selector 506. The collective intent selector 510 can receive data associated with an intent of a trajectory from the trajectory intent selector 508. The state manager 512 can receive data associated with a selected intent from the collective intent selector 510. The state manager 512 can generate or include instructions to cause the lane change system 500 to initiate one of three states: prepare for action state, initiate action state, and action disabled state.

The safe trajectory generator 502 generates safe trajectories (also referred to herein as safe stop options) based on a safe trajectory policy for the autonomous vehicle 200. For example, the safe trajectory generator 502 can determine a trajectory that includes a probability of collision with agents that satisfies a probability threshold (e.g., is below a particular probability of collision) or select a trajectory from a group of trajectories that has the lowest probability of collision with agents. For example, the safe trajectory can be a trajectory such that the autonomous vehicle 200 maintains a lane in which it is disposed, or a trajectory such that the autonomous vehicle 200 changes lanes to a lane that is furthest away from nearby agents. In some examples, the safe trajectory can include vehicle actions such that the autonomous vehicle 200 accelerates, slows, or stops.

The input trajectory generator 504 generates trajectories based on input into the lane change system 500. In some examples, the input trajectory generator 504 generates trajectories based on the input from the user. For example, a user can input instructions to follow a particular route. In some examples, a user can input path instructions that include a preselected route as determined by a GPS navigation system. A user can also input a route manually by entering destination or path inputs before or during operation of the autonomous vehicle 200. In some examples, the user input is based on steering input. In some examples, the route can be input by portions of the planning system 404 separate from the lane change system 500. For example, the planning system 404 can determine that a trajectory should be followed to cause the autonomous vehicle 200 to follow a route designated by the GPS navigation system. The input trajectory generator 504 can then generate a trajectory based on the input from the GPS navigation system to cause the autonomous vehicle 200 to follow the route determined by input trajectory generator 504, based on data from the GPS navigation system.

The input trajectory generator 504 can also generate trajectories based on objects or agents in a vehicle scene. For example, as the autonomous vehicle 200 navigates, the perception system 402 can perceive the environment of the vehicle (e.g., the vehicle scene) and identify objects or agents in the vehicle scene. Based on the environment and objects or agents in the vehicle scene, the input trajectory generator 504 can generate trajectories to enable the autonomous vehicle 200 to navigate the scene (e.g., without colliding with the objects or agents).

The trajectory selector 506 selects a trajectory generated from the input trajectory generator 504 and/or the safe trajectory generator 502. For example, the trajectory selector 506 can determine whether one or more input trajectories from the input trajectory generator 504 meet a threshold of safety and/or desired criteria such as comfort criteria, efficiency criteria, or average speed criteria. If an input trajectory meets the threshold of safety and/or desired criteria, then the trajectory selector 506 can select the input trajectory. But if the input trajectory does not meet the threshold of safety and/or desired criteria, then the trajectory selector 506 can select the safe trajectory.

The trajectory intent selector 508 determines a trajectory intent based on the trajectory selected by the trajectory selector 506. The trajectory intent can be an intended action to cause the autonomous vehicle 200 to follow the selected trajectory. For example, the trajectory intent selector 508 can determine whether the selected trajectory includes a lane change intent, or an intent to maintain a lane position. If the trajectory intent selector 508 determines that the trajectory selected by the trajectory selector 506 includes a lane change intent, then the trajectory intent selector 508 can determine a lane change intent. If the trajectory intent selector 508 does not determine that a lane change is included for the trajectory determined by the trajectory selector 506, then the trajectory intent selector 508 can determine an intent to maintain a current lane.

In some cases, the trajectory intent selector 508 can determine the intents of a trajectory based on movement (e.g., lateral movement) and/or orientation associated with the trajectory. For example, if the trajectory includes lateral movement greater than a threshold amount (e.g., greater than 6 ft.), but ends with the same orientation (or approximately the same orientation), the trajectory intent selector 508 can determine that the trajectory intent is a lane change. Similarly, if the trajectory includes adjusting orientation (or steering wheel) by threshold number of degrees (e.g., fifteen degrees) for a period of time and then returning to the original orientation (or steering wheel position), the trajectory intent selector 508 can determine that the trajectory intent is a lane change.

As another example, if the trajectory includes lateral movement less than a threshold amount (e.g., less than 4 ft.), and ends with the same orientation (or approximately the same orientation), the trajectory intent selector 508 can determine that the trajectory intent is to stay in the same lane. As yet another example, if the trajectory includes a change in orientation by greater than a threshold amount (e.g., change in orientation of greater than forty-five degrees), the trajectory intent selector 508 can determine that the trajectory intent is to turn. Accordingly, it will be understood that the trajectory intent selector 508 can use a variety of mechanisms to determine an intent of a trajectory. In some cases, this can be referred to categorizing a trajectory between different actions or different intents, such as maintain lane, change lanes, turn, etc.

The collective intent selector 510 groups a plurality of trajectory intents selected by the trajectory intent selector 508 over time. The collective intent selector 510 can determine a collective intent based on a collection of trajectory intents selected by the trajectory intent selector 508. The collective intent can be a majority or threshold number of intended trajectory determinations collected over time. In some examples, the collective intent selector 510 can place the vehicle action intent in a data buffer with a set of vehicle action intents taken over a period of time to determine a collective intent based on the scene data. For example, the collective intent selector 510 can determine the collective intent based on the trajectory intents collected over a period of time (e.g., 2 s, 3 s, 5 s, 10 s, etc.). For example, the planning system 404 can use the trajectory intents collected every 0.2 seconds (or some other frequency) for a period of 5 seconds (or some other period) to determine the collective intent. In other examples the planning system 404 can determine the collective intent over any desired time period (e.g., 10 s, 20 s, 30 s sec 1 min, 3 min, etc.).

In some examples, the collective intent selector 510 can determine the collective intent based on a threshold number (e.g., a majority, largest percentage as compared with other intents, etc.) of the collected trajectory intents having the same intent. For example, if a majority of the collected trajectory intents have a "change lane" intent, the collective intent selector 510 can determine that the collective intent is "change lanes." In some cases, the collective intent is binary: change lanes or maintain lane. For example, where the planning system 404 determines there is a first lane that the autonomous vehicle 200 is traveling in and a second lane adjacent the lane that the autonomous vehicle 200 is traveling in, the collective intent can indicate whether the autonomous vehicle 200 should remain in the first lane or move from the first lane to the second lane of the scene. In certain cases, the collective intent can have more than two options.

The state manager 512 is configurable to cause the lane change system 500 to operate in at least one of a plurality of states related to vehicle actions. In the illustrated example, the states include a prepare for action state 514, an initiate action state 516, a pause action state 518, and an action disabled state 520, however, it will be understood that the state manager 512 can include fewer or more states as desired. For example, the initiate action state 516 and the pause action state 518 can be combined as the initiate action state 516.

In the prepare for action state 514, the planning system 404 causes the perception system 402 to obtain vehicle trajectories and determine a (collective) vehicle action intent and select a vehicle action based on the vehicle trajectories. In some cases, the prepare for action state 514 includes a waiting period during which the planning system 404 can collect trajectories, determine vehicle action intents from the trajectories, and determine a collective vehicle action intent (also referred to herein as a collective intent) using collection of vehicle action intents. If during (or after) the waiting period, a vehicle action (or collective intent) is confirmed, the planning system 404 can move from the prepare for action state 514 to the initiate action state 516. If during (or after) the waiting period, the vehicle action is not confirmed, the planning system 404 can move from the prepare for action state 514 to the pause action state 518.

In the initiate action state 516, the planning system 404 initiates action in the autonomous vehicle based on the selected vehicle action (or selected collective intent). In addition, in the initiate action state 516, the planning system 404 can confirm the vehicle action (or collective intent). If the planning system 404 confirms the vehicle action (e.g., the collective intent has not changed), the planning system 404 may complete the vehicle action and move from the initiate action state 516 to the action disabled state 520. If the planning system 404 does not confirm the vehicle action (e.g., the collective intent has changed), the planning system 404 can move from the initiate action state 516 to the pause action state 518.

In the action disabled state 520, the planning system 404 can cause the autonomous vehicle 200 to maintain its current trajectory or operate in a maintain trajectory state, and as such, not operate in the prepare for action 514 or initiate action state 516. In the action disabled state 520, the autonomous vehicle can maintain a previously generated or current trajectory and can determine one or more vehicle action intents or a collective intent. If the collective intent changes (e.g., changes from maintain lane to change lanes), the planning system 404 can move from the action disabled state 520 to the prepare for action state 514. If, however, the collective intent does not change (e.g., stays in maintain lane), the planning system 404 can stay in the action disabled state 520.

In the pause action state 518, the planning system reviews the vehicle's collective intent. If, during a threshold period of time, the collective intent is to not take a particular action (e.g., maintain lane as opposed to change lane), the planning system 404 can move from the pause action state 518 to the action disabled state 520. If during the threshold period of time, the collective vehicle action intent confirms the vehicle action (e.g., the collective intent is or becomes change lanes), the planning system 404 can move from the pause action state 518 to the initiate action state 516.

In some examples, the state manager 512 can determine to operate in the prepare for action state 514 when the collective intent selector 510 determines a collective intent to take an action. For example, the state manager 512 can determine to operate in the prepare for action state 514 when the collective intent is to change lanes.

As described above, the state manager 512 can determine which state to cause the planning system 404 to operate in based on data associated with a collective intent received from the collective intent selector 510. For example, the collective intent selector 510 can determine to operate in a prepare for action state 514 after a first selected intent is evaluated by the collective intent selector 510. In some examples, the state manager 512 can determine to operate in the initiate action state 516 when the collective intent selector 510 determines a collective intent to take action (e.g., change lanes) after a predetermined time interval.

In some examples, the state manager 512 can determine to operate in the action disabled state 520 when the collective intent selector 510 determines that the collective intent is not to take action (e.g., to stay in the current lane). In some examples, the collective intent selector 510 determines that collective intent is not to take action after the state manager 512 has previously initiated the prepare for action state 514. In such cases, the action disabled state 520 can be prioritized over the prepare for action state 514. As such, the state manager 512 can initiate the action disabled state 520 and terminate the prepare for action state 514. The lane change system 500 can then restart the time interval to determine collective intents before evaluating whether to move to the initiate action state 514 again.

Figure 6:
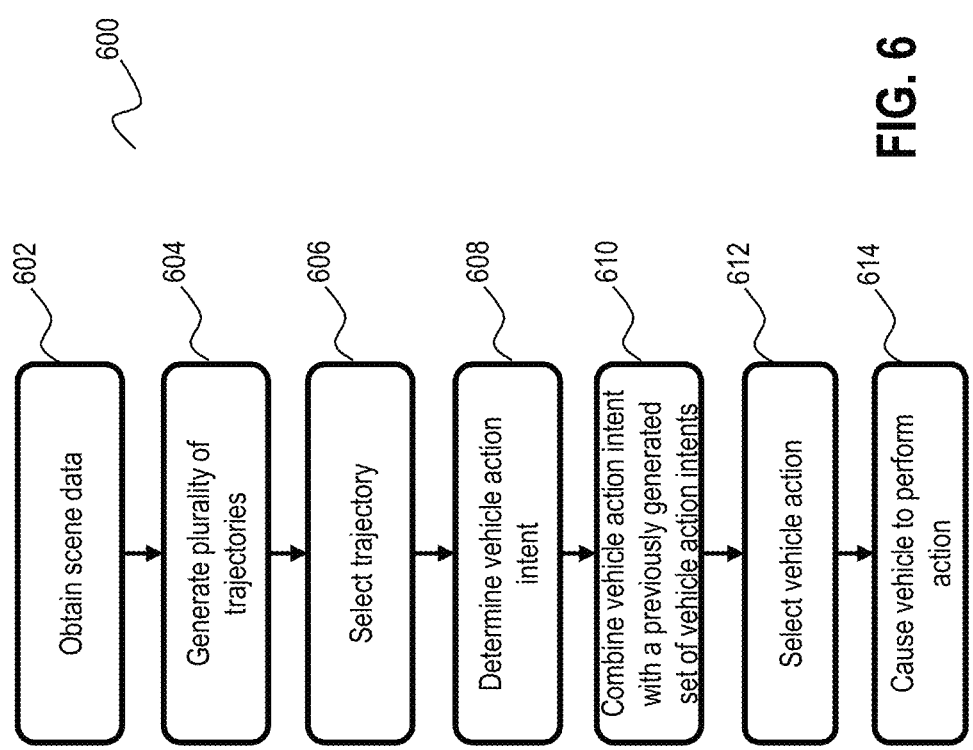
FIG. 6 is a flow diagram illustrating an example of a routine for controlling a vehicle.

FIG. 6 is a flow diagram of an example process 600 for a vehicle trajectory intent determination. In some examples, one or more of the steps described with respect to process 600 are performed (e.g., completely, partially, and/or the like) by the lane change system 500 (e.g., where the lane change system 500 is implemented by the planning system 404 and where the planning system 404 is implemented by autonomous system 202). In some examples, one or more of the steps described with respect to process 600 are performed (e.g., completely, partially, and/or the like) by the planning system 404 (e.g., where the planning system 404 is implemented by autonomous system 202). Additionally, or alternatively, in some examples one or more steps described with respect to process 600 are performed (e.g., completely, partially, and/or the like) by another device or group of devices separate from or including the planning system 404 such as the perception system 402 (e.g., where the perception system 402 is implemented by autonomous system 402).

At block 602, the planning system 404 receives/obtains scene data (e.g., semantic image data) associated with an environment or scene of a vehicle from the perception system 402. In some examples, where the scene data is semantic image data, the scene data can identify at least one physical object in an environment. For example, the planning system 404 can receive semantic image data that identifies a car, pedestrian, road features, and traffic signal in the environment around the autonomous vehicle 200, etc.

In some examples, the scene data identifies agents in the environment based on the semantic image data received from the perception system 402. As described herein, in some examples, the perception system 402 can implement at least one machine learning model as part of a pipeline for classifying one or more objects located in an environment and/or the like. The planning system 404 can identify the various objects from the semantic image data based on the classification of those objects. For example, the planning system 404 can identify one or more cars, pedestrians, road features, or traffic signals as respective objects based on the data received from the perception system 402. In some examples, the scene data can identify lanes of a road. For example, the perception system 402 can detect at least two lanes such as a lane that the autonomous vehicle 200 is in and a lane adjacent the detected lane that the autonomous vehicle 200.

At block 604 the planning system 404 generates trajectories for the autonomous vehicle 200 based on the scene data received from the perception system 402. For example, the scene data can be generated based on at least one object/agent identified in the scene by the perception system 402. The planning system 404 can further trajectories based at least in part on a position of the autonomous vehicle with respect to at least one object/agent identified in the scene. In some examples, the planning system 404 can determine a distance of the autonomous vehicle from an object.

Additionally or alternatively, the planning system 404 can determine a directional orientation of the autonomous vehicle with respect to the object. In some examples, the planning system 404 can generate at least one trajectory based on at least two lanes detected and a determined position of the autonomous vehicle 200 relative to the at least two lanes. As such, in some examples, the planning system 404 can determine a lane change trajectory based on the position of the autonomous vehicle 200 in relation to agents and other objects in the scene.

At block 606, the planning system 404 selects a trajectory from the trajectories generated by the planning system 404. In some examples, the planning system 404 can determine multiple potential trajectories of the autonomous vehicle 200 and compare the multiple potential trajectories of the autonomous vehicle 200. The planning system 404 can then select a desired trajectory based on criteria or evaluation as described above with respect to FIG. 5. In some examples, the planning system 404 selects the trajectory based on a vehicle planning policy. For example, the planning system 404 can select a desired trajectory based on safety (e.g., avoid collisions or near collisions), regulatory (e.g., obey traffic laws), or comfort priorities (do not decelerate/accelerate greater than a threshold amount or do not adjust orientation more than a threshold amount within a threshold time period). In some examples, the planning system 404 can run safety simulations, rank safety of the detailed trajectories, and choose the detailed trajectory that has a safety ranking that satisfies a safety threshold and/or has the highest safety ranking.

At block 608, the planning system 404 determines a vehicle action intent. The planning system 404 determines an intended action based on data generated with respect to the trajectories. As described herein, the planning system 404 can determine whether a trajectory results in or is likely to cause a lane change. For example, the determined trajectory can include portions where the autonomous vehicle 200 maintains a lane position. Alternatively or additionally, the determined trajectory can include a lane change. As such, the vehicle action intent can be based at least in part on the determined trajectory and cause the autonomous vehicle 200 to follow the determined trajectory. For example, if a trajectory is selected that includes a lane change, determining the vehicle action intent can include determining that the selected trajectory includes a lane change.

As described herein, in some cases, the planning system 404 determines the trajectory intent using one or more of: amount of lateral movement from start to finish of the trajectory, change in orientation during the trajectory (e.g., adjust orientation by threshold number of degrees and then return to original orientation), etc.

At block 610, the planning system 404 combines the vehicle action intent with a previously generated set of vehicle action intents. The planning system 404 can combine the vehicle action intent to decrease the probability of an aborted initiated action due to changing conditions in the scene about the autonomous vehicle 200. In some examples, the planning system 404 can determine a vehicle action intent a plurality of times to confirm that the vehicle action intent remains the same over time. For example, the planning system 404 can determine a vehicle action intent over predetermined time intervals (e.g., 1 s, 2 s, 5 s, 10 s, etc.) for a predetermined period of time (e.g., 3 s, 5 s, 10 s, 20 s, etc.) to confirm vehicle action intent over time. The planning system 404 can further evaluate a group of vehicle action intents obtained over a period of time in relation to each other to determine whether a majority or predetermined number of vehicle action intents indicates a consistent intent to change lanes. In some examples, the planning system 404 can place a vehicle action intent in a data buffer (e.g., a first in first out buffer) with a set of determined vehicle action intents to combine the vehicle action intent with the set of vehicle action intents.

At block 612, the planning system 404 selects a vehicle action (or collective intent). In some examples, the vehicle action is selected based on a combination of individual vehicle action intents. In some examples, the planning system 404 determines a collective intent for the autonomous vehicle 200 based on the plurality of vehicle action intents as described herein, and uses the collective intent to select the vehicle action. In some examples, the planning system 404 can select a vehicle action (or collective intent used to select the vehicle action) that corresponds to a threshold quantity of the vehicle action intents. In some examples, the vehicle action (or collective intent used to select the vehicle action) can be selected based on a ratio of vehicle action intents. For example, the planning system 404 can select the vehicle action based on a majority or plurality of individual vehicle action intents over a period of time. For example, if a group of individual vehicle action intents over a predetermined period of time includes three vehicle action intents to change lanes, and two vehicle action intents to maintain a lane position, the planning system 404 can select the vehicle action to change lanes based on the majority of vehicle action intents. In other examples, the vehicle action can be selected based on a unanimous determination of vehicle action intents over a time period, or a threshold number of corresponding vehicle action intents over a time period, irrespective of majority vehicle action intents.

At block 614, the planning system 404 causes the autonomous vehicle 200 to perform an action corresponding to the selected vehicle action. For example, if the selected vehicle action is to change lanes, then the planning system 404 can cause the autonomous vehicle 200 to change lanes. The determined vehicle action can cause the autonomous vehicle 200 to initiate performance of the vehicle action such that the autonomous vehicle 200 remains in a first lane for a threshold time period. The determined vehicle action can alternatively or additionally cause the autonomous vehicle

200 to move from the first lane to a second lane at an expiration of the threshold time period.

In some examples, the planning system 404 can cause the autonomous vehicle 200 to initiate performance of the vehicle action by causing the autonomous vehicle 200 to remain in a first lane for a threshold time period (e.g., await period). In some examples, the planning system 404 can cause the autonomous vehicle 200 to generate a second plurality of vehicle action intents during the threshold period of time. The planning system 404 can cause the autonomous vehicle 200 to move from the first lane to the second lane based on a confirmation that the second plurality of vehicle action intents corresponds to the first plurality of vehicle action intents. For example, the planning system 404 can cause the autonomous vehicle 200 to move from the first lane to a second lane at an expiration of the threshold time period based on a determination that a threshold quantity of the second plurality of vehicle action intents correspond with the first plurality of vehicle action intents (e.g., indicate a lane change).

The planning system 404 can transmit instructions to the drive-by-wire system 202h, which transmits instructions to at least one of the powertrain control system 204, steering control system 206, and brake system 208 to cause the autonomous vehicle 200 to perform the selected vehicle action. For example, the planning system 404 can send instructions to cause the powertrain control system 204 to accelerate and cause the autonomous vehicle 200 move toward the second lane, etc. The planning system 404 can send instructions to cause the steering control system 206 to cause the autonomous vehicle 200 to navigate into the second lane. The planning system 404 can send instructions to cause the brake system 208 to slow the autonomous vehicle 200 to merge into the second lane, etc.

Lane Change System

Figure 7:
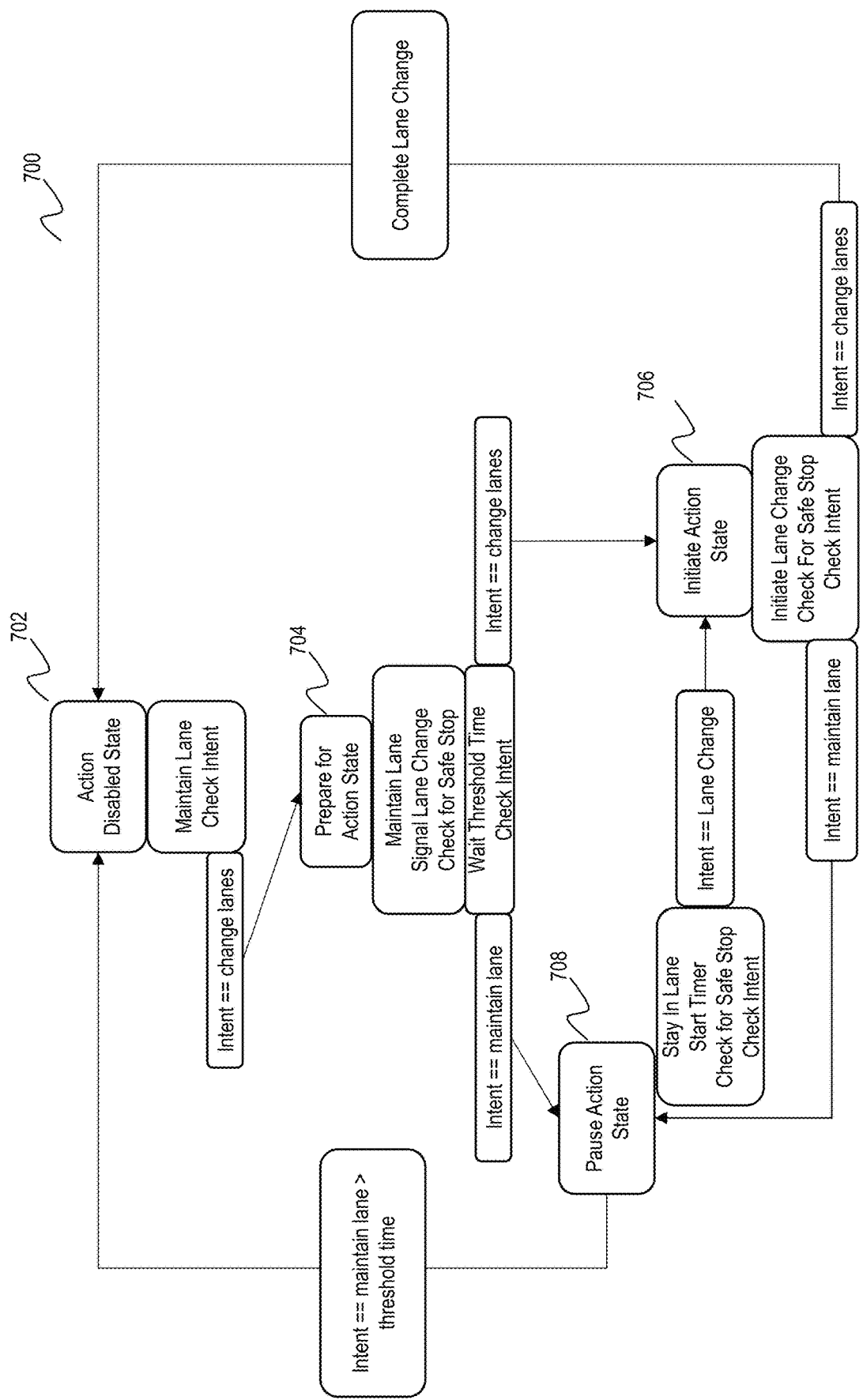
FIG. 7 is a state diagram illustrating an example of process states for a lane change process.

FIG. 7 is a state diagram illustrating an example of different states of a lane change system, such as the lane change system 500, as part of a lane change process. As described herein, the lane change system 500 can form at least part of the planning system 404 and operate in a plurality of states during various points in a lane change sequence. The states can provide the lane change system 500 with a routine that includes intermediate steps between a lane change indication, lane change initiation, and completion of the lane change.

The states and routine can provide more stable lane change sequences and avoid fitful behavior that can occur from the vehicle repeatedly initiating and aborting a lane change (or other action). In some or all of the states, the lane change system 500 can perform or execute decision logic that progresses the lane change system 500 through the different states, which in turn can cause the autonomous vehicle 200 to move through a lane change sequence toward a lane change initiation, or toward restarting the lane change sequence based on confirmation of intent. As such, the lane change system 500 can confirm vehicle action intent and prepare for lane change initiation without causing the autonomous vehicle 200 to make a physical action.

In the illustrated example, the lane change system 700 includes the following states: the action disabled state 702, the prepare for action state 704, the initiate action state 706, and the pause action state 708, however, it will be understood that the lane change system 500 can include fewer or more states. For example, in some cases, the initiate action state 706 and the pause action state 708 can be combined as one state.

While in the action disabled state 702, the lane change system 500 can cause the autonomous vehicle to stay in a current lane. For example, if the autonomous vehicle 200 is traveling in a first lane and the lane change system 500 is in the action disabled state 702, the lane change system 500 can cause the autonomous vehicle 200 to continue traveling in the first lane. The lane change system 500 can also check if a safe stop option should be engaged (e.g., whether the vehicle should engage in an emergency stop, etc.).

In addition, in the action disabled state 702, the lane change system 500 determines an intent of the vehicle (or collective intent) using one or more vehicle action intents. For example, the lane change system 500 can determine the collective intent based on one or more trajectories and/or one or more vehicle action intents, as described herein at least with reference to FIG. 5 and FIG. 6. However, if the lane change system 500 determines an (collective) intent is to change lanes, the lane change system 500 can move to the prepare for action state 704.

In the prepare for action state 704, the autonomous vehicle 200 can remain in its lane, but signal a lane change (e.g., activate turn signal, communicate lane change intent wirelessly to other vehicles such as autonomous vehicles, etc.). The lane change system 500 can also check a safe trajectory or safe stop option, as described herein at least with reference to FIG. 5, to determine if the safe stop option is desired (e.g., determined to be safer) over a lane change or a change-lane trajectory. In addition, in the prepare for action state 704, the lane change system 500 can wait for a threshold time period (also referred to herein as a waiting period).

In some cases, at the end of the waiting period, the lane change system 500 checks a (collective) intent of the vehicle. The waiting period can be sized such that some or all of the vehicle action intents used to determine the collective intent that moved the lane change system 500 from the action disabled state 702 to the action state 704 are not used to determine the collective intent at the end of the waiting period. For example, if a data buffer used to collect the vehicle action intents stores two seconds of vehicle action intents, the waiting period can be greater than two seconds so that all of the vehicle action intents used to move the lane change system 500 to the action state 704 are not used at the end of the waiting period or the waiting period can be 0.5 seconds so that approximately 75% (or one second so that approximately 50%) of the vehicle action intents used to move the lane change system 500 to the action state 704 are used at the end of the waiting period, etc.

If (at the end of the waiting period) the lane change system 500 determines the (collective) intent is to change lanes, the lane change system 500 can operate in (or move to) the initiate action state 706. If the lane change system 500 determines the intent is to maintain lane, the lane change system 500 operate in (or change to) the pause action state 708.

In the initiate action state 706, the lane change system 500 causes the planning system 404 to initiate a lane change. As part of initiating the lane change, the lane change system 500 can cause the vehicle to begin moving into a different lane (e.g., by adjusting the steering wheel or orientation of the vehicle, etc.)

As the lane change system 500 initiates a lane change, the lane change system 500 can check if the safe stop option is more desirable than a lane change trajectory (e.g., confirm that the vehicle should engage in an emergency stop, etc.). In addition, the lane change system 500 can check the collective intent to determine whether the collective intent has changed (e.g., from change lanes to maintain lane). In some such cases, the lane change system 500 may not use a waiting period before checking the (collective) intent of the vehicle.

If the collective intent is to (or remains) change lanes, the lane change system 500 can cause the autonomous vehicle 200 to complete the lane change. For example, the lane change system 500 can cause the autonomous vehicle 200 to complete its move into the other lane.

If the (collective) intent is to maintain lane, the lane change system 500 can enter the pause action state 708. In the pause action state 708, the lane change system 500 can cause the autonomous vehicle 200 to maintain its current lane (and/or move back to the center of the current lane) and start a timer. The lane change system 500 can also check whether the safe stop option is more desirable than a lane change.

In addition, in the pause action state 708, the lane change system 500 can check the (collective) intent of the vehicle to determine if the (collective) intent is to change lanes or maintain lane. If the (collective) intent is (or changes) to change lanes, then the lane change system 500 can move to the initiate action state 706. If the (collective) intent is to (or remains) maintain lane for a threshold period of time (e.g., 3 s, 5 s, 10 s), the lane change system 500 can move to the action disabled state 702. In moving to the action disabled state 702, the lane change system 500 can prevent fluctuations between initiating a lane change and aborting.

Figure 8:
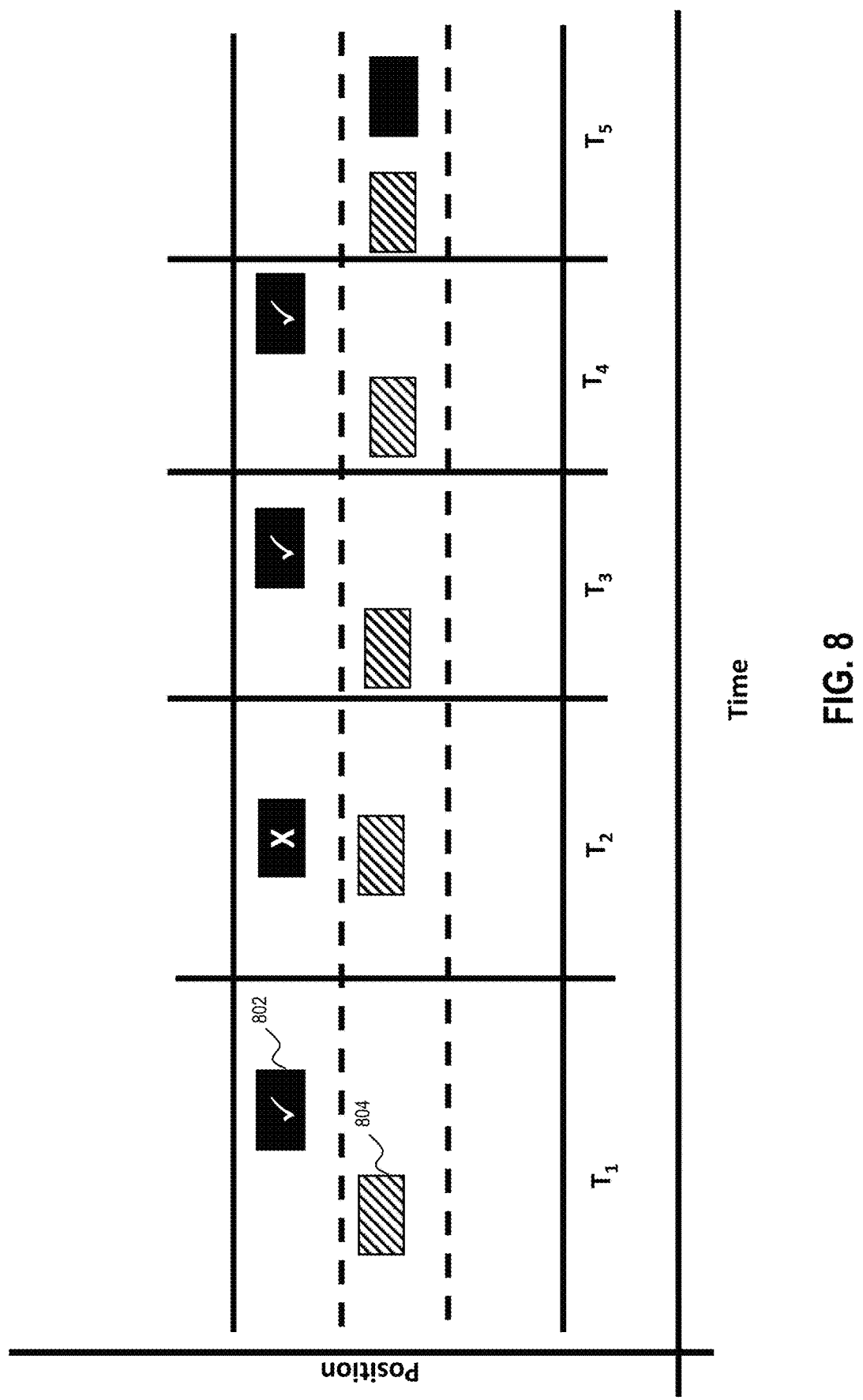
FIG. 8 is a block diagram illustrating an example of a vehicle positions associated with a lane change process.

FIG. 8 is a block diagram illustrating an example of a vehicle 802 using the lane change system 500 to change lanes. FIG. 8 shows the vehicle 802 performing a lane change sequence while avoiding an agent 804 in an adjacent lane. The vehicle 802 (substantially similar to the autonomous vehicle 200) is disposed in a first lane and the agent 804 is disposed in a second lane adjacent the first lane. The perception system 402 of the autonomous vehicle 802 obtains data associated with the vehicle scene, including indications of the second lane, over five consecutive time intervals. The planning system 404 determines one or more trajectories at each of the time intervals based on the data provided by the perception system 402, and generates vehicle action intents from the lane trajectories.

At the first time interval $T_1$, the agent 804 does not obstruct a lane change trajectory and the lane change system 500 determines that the collective intent is to change lanes (e.g., based on the vehicle action intents at or before $T_1$). Assuming the lane change system 500 is in the action disabled state 702 at $T_1$, the lane change system 500 can move from the action disabled state 702 to the prepare for action state 704.

At the second time interval $T_2$, the agent 804 obstructs a lane change trajectory and the lane change system 500 determines the vehicle action intents during $T_2$ as maintain lane. Assuming $T_2$ is during the waiting period of the prepare for action state 704, the lane change system 500 can collect the vehicle action intents but may not act on them.

At the third time interval $T_3$, the agent 804 does not to obstruct a lane change trajectory and the lane change system 500 determines the vehicle action intents during $T_3$ as change lanes. Assuming $T_3$ is at the end of the waiting period, the lane change system 500 can determine the collective intent based on the vehicle action intents collected during some or all of $T_2$ and some, all, or none of $T_1$. Based on the vehicle action intents of maintain lane collected during $T_2$, the lane change system 500 can determine that the (collective) intent is to maintain lane. As such, the lane change system 500 can move from the prepare for action state 704 to the pause action state 708 and continue to monitor the vehicle action intents and determine collective intents.

At the fourth time interval $T_4$, the agent 804 is determined to be in the second lane and not to obstruct a lane change trajectory, and the lane change system 500 determines that the vehicle action intents during $T_4$ are change lanes. Assuming that the lane change system 500 is in the pause action state 708 at $T_4$, the lane change system 500 can determine the collective intent based on the vehicle action intents collected during $T_3$, some, all, or none $T_2$, and/or some, all, or none of $T_1$. Assuming the lane change system 500 determines the collective intent as change lanes, the lane change system 500 can move to the initiate action state 706.

At the fifth time interval $T_5$ (and with the lane change system 500 still in the initiate action state 706), the lane change system 500 continues to collect vehicle action intents and determine collective intents. Depending on the amount of vehicle action intents used to determine the collective intent, the lane change system 500 can determine the collective intent based on the vehicle action intents collected during some or all of $T_4$, some, all, or none $T_3$, and/or some, all, or none of $T_2$. Based on the collected vehicle action intents, the lane change system 500 determines that the collective intent is change lanes, causes the autonomous vehicle 802 to complete the lane change from the first lane to the second lane, and moves to the action disabled state 702.

Figure 9:
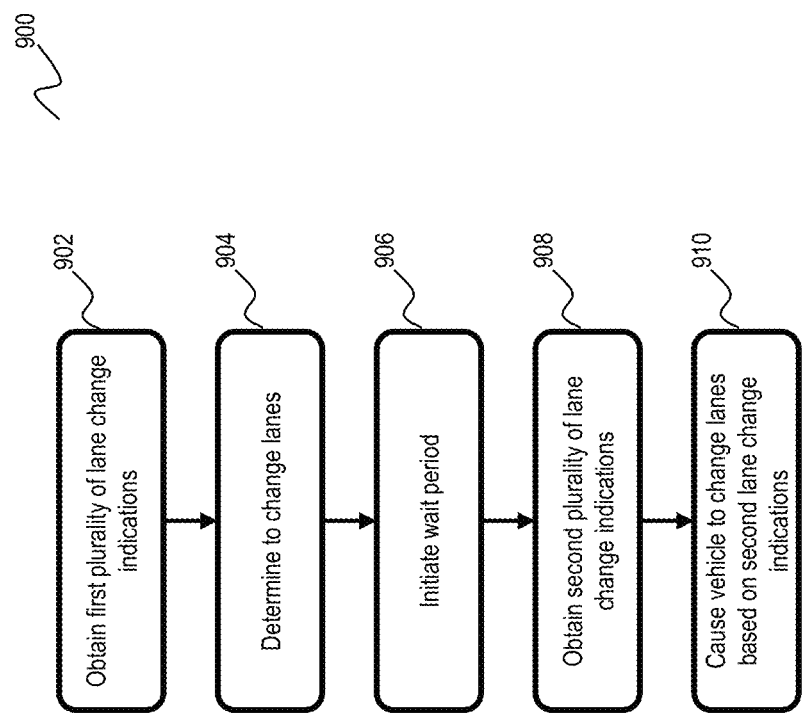
FIG. 9 is a flow diagram illustrating an example of a routine for causing a vehicle to change lanes.

FIG. 9 is a flow diagram illustrating an example of a process 900 for a vehicle lane change. In some examples, one or more of the steps described with respect to process 900 are performed (e.g., completely, partially, and/or the like) by the lane change system 500 (e.g., where the lane change system 500 is implemented by the planning system 404 and where the planning system 404 is implemented by autonomous system 202).

Additionally, or alternatively, in some examples one or more steps described with respect to process 600 are performed (e.g., completely, partially, and/or the like) by another device or group of devices separate from or including the planning system 404 such as the perception system 402 (e.g., where the perception system 402 is implemented by the autonomous vehicle compute 400).

At block 902 the planning system 404 receives/obtains a first plurality of lane change indications. The first plurality of lane change indications can be vehicle action intents as described above with respect to FIG. 6. In some examples, the lane change indication can be a manual indication by a user such as pressing a button or issuing any other user input to indicate an intent to change lanes. In some examples, the lane change intent is determined by the planning system 404 as a determination that lane change criteria such as safety and user intent are satisfied to change lanes. In some examples, the first plurality of lane change indications are successively determined over a period of time as described above with respect to FIG. 5.

At block 904, the planning system 404 determines to change lanes based on the lane change indications. In some examples, a certain number of successive lane change indications indicates a lane change intent. In other examples, a certain majority of lane change indications can confirm a lane change. For example, the lane change system 500 can use multiple vehicle action intents (e.g., majority or plurality) to determine a collective intent to change lanes, and determine to change lanes based on the collective intent.

At block 906, the planning system 404 initiates a wait period or waiting period. The wait period can be a period of time between when there is a determination to change lanes and when the planning system 404 initiates the lane change as described herein. In some cases, the wait period can be a period sufficient to provide a desired probability of changing conditions in a potential lane change trajectory.

During the wait period, the planning system 404 can activate a turn signal to allow surrounding traffic to react to the turn signal. For example, the planning system 404 can initiate a wait period of five second and activate the turn signal during the wait period. During the five second wait period, the planning system 404 can allow the traffic around the autonomous vehicle 200 to react to the turn signal and evaluate lane change trajectories, vehicle action intents, and collective intents, based on any adjustments made by surrounding traffic.

At block 908, the planning system 404 obtains a second plurality of lane change indications. The second plurality of lane change indications can be successive indications based on a plurality of a vehicle action intents as described above with respect to FIG. 5.

In some examples, the planning system 404 can cause the autonomous vehicle 200 to generate the second plurality of lane change indications during the wait period. In some cases, the second plurality of lane change indications includes some or all of the first plurality of lane change indications. In certain cases, the second plurality of lane change indications includes none of the first plurality of lane change indications.

At block 910, the planning system 404 causes the autonomous vehicle 200 to change lanes based on the second plurality of lane change indications. In some cases, the planning system 404 can cause the autonomous vehicle 200 to move from the first lane to the second lane based on a confirmation that the second plurality of lane change indications agrees with the first plurality of lane change indications. For example, the planning system 404 can cause the autonomous vehicle 200 to move from the first lane to a second lane at an expiration of the wait period based on a determination that a threshold quantity of the second plurality of lane change indications correspond with the first plurality of lane change indications and indicate a lane change. In some cases, the planning system 404 can cause the autonomous vehicle 200 to move from the first lane to the second lane based on a collective intent determined using the second plurality of lane change indications. For example, if the plurality of lane change indications are vehicle action intents, the planning system 404 can determine a collective intent using the second plurality of vehicle action intents. Based on a determination that the collective intent is to change lanes (similar to the determination made at block 904), the planning system 404 can cause the vehicle to change lanes.

To cause the vehicle to change lanes, the planning system 404 can transmit instructions to the drive-by-wire system 202*h*, which transmits instructions to at least one of the powertrain control system 204, steering control system 206, and brake system 208 to cause the autonomous vehicle 200 to follow the selected path. For example, the planning system 404 can send instructions to cause the powertrain control system 204 to change direction and cause the autonomous vehicle 200 to move toward the second lane, send instructions to cause the steering control system 206 to cause the autonomous vehicle 200 to navigate into the second lane, and/or send instructions to cause the brake system 208 to slow the autonomous vehicle 200 to merge into the second lane.

The flow diagrams illustrated in FIGS. 6 and 9 are provided for illustrative purposes only. It will be understood that one or more of the steps of the routines illustrated in FIGS. 6 and 9 can be removed or that the ordering of the steps can be changed. In addition, it will be understood that one or more steps from FIG. 6 can be combined with one or more steps from FIG. 9. Furthermore, for the purposes of illustrating a clear example, one or more particular system components are described in the context of performing various operations during each of the data flow stages. However, other system arrangements and distributions of the processing steps across system components can be used.

In some examples, one or more of the steps described with respect to processes 600, and 900 are performed (e.g., completely, partially, and/or the like) by the planning system 404 or other systems of the autonomous vehicle 200. Additionally, or alternatively, in some embodiments one or more steps described with respect to processes 600, and 900 are performed (e.g., completely, partially, and/or the like) by another device or group of devices separate from or including the planning system 404 or other systems of the autonomous vehicle 200 such as a processor remote from the planning system 404 or other systems of the autonomous vehicle 200.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

Various additional example embodiments of the disclosure can be described by the following clauses:

Clause 1. A method for operating an autonomous vehicle, the method comprising:

obtaining a first plurality of successive lane change indications, wherein each lane change indication of the first plurality of successive lane change indications is generated based on respective scene data associated with a scene of an autonomous vehicle, wherein each of the first plurality of successive lane change indications indicates whether the autonomous vehicle should remain in a first lane of the scene or move from the first lane to a second lane of the scene; determining to cause the autonomous vehicle to move from the first lane to the second lane based on the first plurality of successive lane change indications; initiating a wait period based on the determining to cause the vehicle to move from the first lane to the second lane; obtaining a second plurality of successive lane change indications during the wait period, wherein each of the second plurality of successive lane change indications indicates whether the autonomous vehicle should remain in the first lane or move from the first lane to the second lane; and causing the autonomous vehicle to move from the first lane to the second lane based on the second plurality of successive lane change indications.

Clause 2. The method of clause 1 further comprising: generating a plurality of trajectories from first scene data; selecting a first trajectory of the plurality of trajectories; generating a lane change indication of the first plurality of successive lane change indications based on the first trajectory, wherein each of the first plurality of successive lane change indications correspond to a respective trajectory generated from respective scene data.

Clause 3. The method of clause 1, wherein obtaining a first plurality of successive lane change indications comprises obtaining a first plurality of successive lane change indications wherein that have each been generated at a different time.

Clause 4. The method of clause 1, wherein determining to cause the autonomous vehicle to move from the first lane to the second lane comprises changing a state of the autonomous vehicle to a preparing for lane change state.

Clause 5. The method of clause 1, wherein determining to cause the autonomous vehicle to move from the first lane to the second lane comprises determining to cause the autonomous vehicle to move from the first lane to the second lane based on a determination that a threshold quantity of the first plurality of successive lane change indications and the second plurality of successive lane change indications indicate that the autonomous vehicle should move from the first lane to a second lane of the scene.

Clause 6. The method of clause 1, wherein determining to cause the autonomous vehicle to move from the first lane to the second lane comprises determining to cause the autonomous vehicle to move from the first lane to the second lane based on a determination that a majority of the first plurality of successive lane change indications and the second plurality of successive lane change indications indicate that the autonomous vehicle should move from the first lane to a second lane of the scene.

Clause 7. The method of clause 1, wherein obtaining at least one of the first plurality of successive lane change indications and the second plurality of successive lane change indications comprises obtaining successive lane change indications within a predetermined range of time.

Clause 8. The method of clause 1, further comprising: generating a plurality of trajectories from first scene data;
selecting a first trajectory of the plurality of trajectories;
generating a lane change indication of the second plurality of successive lane change indications based on the first trajectory,
wherein each of the second plurality of successive lane change indications correspond to a respective trajectory generated from respective scene data.

Clause 9. The method of clause 1, wherein causing the autonomous vehicle to move from the first lane to the second lane comprises causing the autonomous vehicle to move from the first lane to the second lane based on a determination that a threshold quantity of the second plurality of successive lane change indications indicate that the autonomous vehicle should move from the first lane to a second lane of the scene.

Clause 10. The method of clause 1, wherein causing the autonomous vehicle to move from the first lane to the second lane based on the second plurality of successive lane change indications comprises causing the autonomous vehicle to move from the first lane to the second lane based on the second plurality of successive lane change indications and at least one lane change indication of the first plurality of successive lane change indications.

Clause 11. A system, comprising: at least one processor, and at least one non-transitory storage media storing instructions that, when executed by the at least one processor, cause the at least one processor to: obtain a first plurality of successive lane change indications, wherein each lane change indication of the first plurality of successive lane change indications is generated based on respective scene data associated with a scene of an autonomous vehicle, wherein each of the first plurality of successive lane change indications indicates whether the autonomous vehicle should remain in a first lane of the scene or move from the first lane to a second lane of the scene; determine to cause the autonomous vehicle to move from the first lane to the second lane based on the first plurality of successive lane change indications; initiate a wait period based on the determining to cause the vehicle to move from the first lane to the second lane; obtain a second plurality of successive lane change indications during the wait period, wherein each of the second plurality of successive lane change indications indicates whether the autonomous vehicle should remain in the first lane or move from the first lane to the second lane; and cause the autonomous vehicle to move from the first lane to the second lane based on the second plurality of successive lane change indications.

Clause 12. The system of clause 11, wherein the at least one processor is further configured to generate a plurality of trajectories from first scene data; selectin a first trajectory of the plurality of trajectories; generate a lane change indication of the first plurality of successive lane change indications based on the first trajectory, wherein each of the first plurality of successive lane change indications correspond to a respective trajectory generated from respective scene data.

Clause 13. The system of clause 11 or 12, wherein the at least one processor is further configured to generate a plurality of trajectories from first scene data, wherein obtaining a first plurality of successive lane change indications comprises obtaining a first plurality of successive lane change indications wherein that have each been generated at a different time.

Clause 14. The system of any of clauses 11-13, wherein the at least one processor is further configured to cause the autonomous vehicle to move from the first lane to the second lane based on a determination that a threshold quantity of the first plurality of successive lane change indications and the second plurality of successive lane change indications indicate that the autonomous vehicle should move from the first lane to a second lane of the scene.

Clause 15. The system of any of clauses 11-14, wherein determining to cause the autonomous vehicle to move from the first lane to the second lane comprises determining to cause the autonomous vehicle to move from the first lane to the second lane based on a determination that a majority of the first plurality of successive lane change indications and the second plurality of successive lane change indications indicate that the autonomous vehicle should move from the first lane to a second lane of the scene.

Clause 16. At least one non-transitory storage media storing instructions that, when executed by at least one processor, cause the at least one processor to: obtain a first plurality of successive lane change indications, wherein each lane change indication of the first plurality of successive lane change indications is generated based on respective scene data associated with a scene of an autonomous vehicle, wherein each of the first plurality of successive lane change indications indicates whether the autonomous vehicle should remain in a first lane of the scene or move from the first lane to a second lane of the scene; determine to cause the autonomous vehicle to move from the first lane to the second lane based on the first plurality of successive lane change indications; initiate a wait period based on the determining to cause the vehicle to move from the first lane to the second lane; obtain a second plurality of successive lane change indications during the wait period, wherein each of the second plurality of successive lane change indications indicates whether the autonomous vehicle should remain in the first lane or move from the first lane to the second lane; and cause the autonomous vehicle to move from the first lane to the second lane based on the second plurality of successive lane change indications.

Clause 17. The at least one non-transitory storage media of clause 16, wherein the at least one processor is further configured to generate a plurality of trajectories from first scene data; selectin a first trajectory of the plurality of trajectories; generate a lane change indication of the first plurality of successive lane change indications based on the first trajectory, wherein each of the first plurality of successive lane change indications correspond to a respective trajectory generated from respective scene data.

Clause 18. The at least one non-transitory storage media of clause 16 or 17, wherein the at least one processor is further configured to generate a plurality of trajectories from first scene data, wherein obtaining a first plurality of successive lane change indications comprises obtaining a first plurality of successive lane change indications wherein that have each been generated at a different time.

Clause 19. The at least one non-transitory storage media of any of clauses 16-18, wherein the at least one processor is further configured to cause the autonomous vehicle to move from the first lane to the second lane based on a determination that a threshold quantity of the first plurality of successive lane change indications and the second plurality of successive lane change indications indicate that the autonomous vehicle should move from the first lane to a second lane of the scene.

Clause 20. The at least one non-transitory storage media of any of clauses 16-19, wherein determining to cause the autonomous vehicle to move from the first lane to the second lane comprises determining to cause the autonomous vehicle to move from the first lane to the second lane based on a determination that a majority of the first plurality of successive lane change indications and the second plurality of successive lane change indications indicate that the autonomous vehicle should move from the first lane to a second lane of the scene.

Clause 21. A method for operating an autonomous vehicle, the method comprising: obtaining, by at least one processor, first scene data associated with a scene of an autonomous vehicle; generating a plurality of trajectories for the autonomous vehicle based on the first scene data; selecting a trajectory from the plurality of trajectories; determining a vehicle action intent of the selected trajectory; combining the vehicle action intent of the selected trajectory with a set of vehicle action intents to form a plurality of vehicle action intents, wherein the set of vehicle action intents correspond to a set of trajectories generated prior to the selected trajectory from second scene data; selecting a vehicle action for the autonomous vehicle based on the plurality of vehicle action intents; and causing the autonomous vehicle to initiate performance of the vehicle action based on the selecting the action.

Clause 22. The method of clause 21, wherein generating the plurality of trajectories comprises generating the plurality of trajectories based on at least one object identified in the scene and a determined position of the autonomous vehicle relative to the at least one object.

Clause 23. The method of clause 21, wherein generating the plurality of trajectories comprises generating the plurality of trajectories based on at least two lanes detected and a determined position of the autonomous vehicle relative to the at least two lanes.

Clause 24. The method of clause 21, wherein selecting the trajectory comprises selecting the trajectory based on a vehicle planning policy.

Clause 25. The method of claim 21, wherein determining the vehicle action intent comprises determining that the selected trajectory includes a lane change.

Clause 26. The method of claim 21, wherein combining the vehicle action intent with the set of vehicle action intents comprises placing the vehicle action intent in a buffer with the set of vehicle action intents.

Clause 27. The method of claim 21, wherein selecting the vehicle action for the autonomous vehicle based on the plurality of vehicle action intents comprises selecting a vehicle action that corresponds to a threshold quantity of the vehicle action intents.

Clause 28. The method of claim 21, wherein selecting the vehicle action for the autonomous vehicle based on the plurality of vehicle action intents comprises selecting a vehicle action that corresponds to a majority of the vehicle action intents.

Clause 29. The method of claim 21, wherein the vehicle action is changing lanes, wherein causing the autonomous vehicle to initiate performance of the vehicle action comprises causing the autonomous vehicle to change lanes.

Clause 30. The method of claim 21, wherein the vehicle action is changing lanes, wherein causing the autonomous vehicle to initiate performance of the vehicle action comprises causing the autonomous vehicle to remain in a first lane for a threshold time period and causing the autonomous vehicle to move from the first lane to a second lane at an expiration of the threshold time period.

Clause 31. The method of claim 21, wherein the vehicle action is changing lanes, wherein causing the autonomous vehicle to initiate performance of the vehicle action comprises causing the autonomous vehicle to remain in a first lane for a threshold time period and causing the autonomous vehicle to move from the first lane to a second lane at an expiration of the threshold time period.

Clause 32. The method of claim 21, wherein the vehicle action is changing lanes, wherein the plurality of vehicle action intents is a first plurality of vehicle action intents, wherein causing the autonomous vehicle to initiate performance of the vehicle action comprises: causing the autonomous vehicle to remain in a first lane for a threshold time period; generating a second plurality of vehicle action intents during the threshold time period; and causing the autonomous vehicle to move from the first lane to a second lane at an expiration of the threshold time period based on a determination that a threshold quantity of the second plurality of vehicle action intents indicate a lane change.

Clause 33. A system, comprising: at least one processor, and at least one non-transitory storage media storing instructions that, when executed by the at least one processor, cause the at least one processor to: obtain, by at least one processor, first scene data associated with a scene of an autonomous vehicle; generate a plurality of trajectories for the autonomous vehicle based on the first scene data; select a trajectory from the plurality of trajectories; determine a vehicle action intent of the selected trajectory; combine the vehicle action intent of the selected trajectory with a set of vehicle action intents to form a plurality of vehicle action intents, wherein the set of vehicle action intents correspond to a set of trajectories generated prior to the selected trajectory from second scene data; select a vehicle action for the autonomous vehicle based on the plurality of vehicle action intents; and cause the autonomous vehicle to initiate performance of the vehicle action based on the selecting the action.

Clause 34. The system of claim 33, wherein the at least one processor generates the plurality of trajectories based on at least one object identified in the scene and a determined position of the autonomous vehicle relative to the at least one object.

Clause 35. The system of claim 33 or 34, wherein the at least one processor generates the plurality of trajectories based on at least two lanes detected and a determined position of the autonomous vehicle relative to the at least two lanes.

Clause 36. The system of claim 33-35, wherein the at least one processor selects the trajectory based on a vehicle planning policy.

Clause 37. At least one non-transitory storage media storing instructions that, when executed by at least one processor, cause the at least one processor to:
obtain, by at least one processor, first scene data associated with a scene of an autonomous vehicle; generate a plurality of trajectories for the autonomous vehicle based on the first scene data; select a trajectory from the plurality of trajectories; determine a vehicle action intent of the selected trajectory; combine the vehicle action intent of the selected trajectory with a set of vehicle action intents to form a plurality of vehicle action intents, wherein the set of vehicle action intents correspond to a set of trajectories generated prior to the selected trajectory from second scene data; select a vehicle action for the autonomous vehicle based on the plurality of vehicle action intents; and cause the autonomous vehicle to initiate performance of the vehicle action based on the selecting the action.

Clause 38. The at least one non-transitory storage media of claim 37, wherein the at least one processor generates the plurality of trajectories based on at least one object identified in the scene and a determined position of the autonomous vehicle relative to the at least one object.

Clause 39. The at least one non-transitory storage media of claim 37 or 38, wherein the at least one processor generates the plurality of trajectories based on at least two lanes detected and a determined position of the autonomous vehicle relative to the at least two lanes.

Clause 40. The at least one non-transitory storage media of any of claims 37-39, wherein the at least one processor selects the trajectory based on a vehicle planning policy.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method for operating an autonomous vehicle, the method comprising:
    obtaining, using at least one processor, first scene data associated with a scene of an autonomous vehicle;
    generating, using the at least one processor, a plurality of trajectories for the autonomous vehicle based on the first scene data;
    selecting a trajectory from the plurality of trajectories;
    determining, using the at least one processor, a vehicle action intent of the selected trajectory;
    combining, using the at least one processor, the vehicle action intent of the selected trajectory with a set of vehicle action intents to form a plurality of vehicle action intents, wherein the set of vehicle action intents correspond to a set of trajectories generated prior to the selected trajectory from second scene data;
    selecting, using the at least one processor, a vehicle action for the autonomous vehicle based on the plurality of vehicle action intents; and
    causing, using the at least one processor, the autonomous vehicle to initiate performance of the vehicle action based on the selecting the action, wherein the vehicle action is changing lanes, and wherein causing the autonomous vehicle to initiate performance of the vehicle action comprises causing the autonomous vehicle to remain in a first lane for a threshold time period.

2. The method of claim 1, wherein generating the plurality of trajectories comprises generating the plurality of trajectories based on one or more of at least one object identified in the scene and a determined position of the autonomous vehicle relative to the at least one object, and at least two lanes detected and a determined position of the autonomous vehicle relative to the at least two lanes.

3. The method of claim 1, wherein determining the vehicle action intent comprises determining that the selected trajectory includes a lane change.

4. The method of claim 1, wherein combining the vehicle action intent with the set of vehicle action intents comprises placing the vehicle action intent in a buffer with the set of vehicle action intents.

5. The method of claim 1, wherein selecting the vehicle action for the autonomous vehicle based on the plurality of vehicle action intents comprises selecting a vehicle action that corresponds to a threshold quantity of the vehicle action intents.

6. The method of claim 1, wherein causing the autonomous vehicle to initiate performance of the vehicle action further comprises causing the autonomous vehicle to move from the first lane to a second lane at an expiration of the threshold time period.

7. The method of claim 1, wherein the plurality of vehicle action intents is a first plurality of vehicle action intents, wherein causing the autonomous vehicle to initiate performance of the vehicle action further comprises:
    generating a second plurality of vehicle action intents during the threshold time period; and
    causing the autonomous vehicle to move from the first lane to a second lane at an expiration of the threshold time period based on a determination that a threshold quantity of the second plurality of vehicle action intents indicate a lane change.

8. A system, comprising:
at least one processor, and
at least one non-transitory storage media storing instructions that, when executed by the at least one processor, cause the at least one processor to:
obtain, by at least one processor, first scene data associated with a scene of an autonomous vehicle;
generate a plurality of trajectories for the autonomous vehicle based on the first scene data;
select a trajectory from the plurality of trajectories;
determine a vehicle action intent of the selected trajectory;
combine the vehicle action intent of the selected trajectory with a set of vehicle action intents to form a plurality of vehicle action intents, wherein the set of vehicle action intents correspond to a set of trajectories generated prior to the selected trajectory from second scene data;
select a vehicle action for the autonomous vehicle based on the plurality of vehicle action intents; and
cause the autonomous vehicle to initiate performance of the vehicle action based on the selecting the action, wherein the vehicle action is changing lanes, and wherein causing the autonomous vehicle to initiate performance of the vehicle action comprises causing the autonomous vehicle to remain in a first lane for a threshold time period.

9. The system of claim 8, wherein the at least one processor generates the plurality of trajectories based on one or more of at least one object identified in the scene and a determined position of the autonomous vehicle relative to the at least one object, and at least two lanes detected and a determined position of the autonomous vehicle relative to the at least two lanes.

10. At least one non-transitory storage media storing instructions that, when executed by at least one processor, cause the at least one processor to:
obtain, by at least one processor, first scene data associated with a scene of an autonomous vehicle;
generate a plurality of trajectories for the autonomous vehicle based on the first scene data;
select a trajectory from the plurality of trajectories;
determine a vehicle action intent of the selected trajectory;
combine the vehicle action intent of the selected trajectory with a set of vehicle action intents to form a plurality of vehicle action intents, wherein the set of vehicle action intents correspond to a set of trajectories generated prior to the selected trajectory from second scene data;
select a vehicle action for the autonomous vehicle based on the plurality of vehicle action intents; and
cause the autonomous vehicle to initiate performance of the vehicle action based on the selecting the action, wherein the vehicle action is changing lanes, and wherein causing the autonomous vehicle to initiate performance of the vehicle action comprises causing the autonomous vehicle to remain in a first lane for a threshold time period.

11. The at least one non-transitory storage media of claim 10, wherein the at least one processor generates the plurality of trajectories based on one or more of at least one object identified in the scene and a determined position of the autonomous vehicle relative to the at least one object, and at least two lanes detected and a determined position of the autonomous vehicle relative to the at least two lanes.

12. The at least one non-transitory storage media of claim 10, wherein the at least one processor generates the plurality of trajectories based on at least two lanes detected and a determined position of the autonomous vehicle relative to the at least two lanes.

13. A method for operating an autonomous vehicle, the method comprising:
obtaining, using at least one processor, a first plurality of successive lane change indications, wherein each lane change indication of the first plurality of successive lane change indications is generated based on respective scene data associated with a scene of an autonomous vehicle, and wherein each of the first plurality of successive lane change indications indicates whether the autonomous vehicle should remain in a first lane of the scene or move from the first lane to a second lane of the scene;
determining, using the at least one processor, to cause the autonomous vehicle to move from the first lane to the second lane based on the first plurality of successive lane change indications;
initiating, using the at least one processor, a wait period based on determining to cause the vehicle to move from the first lane to the second lane;
obtaining, using the at least one processor, a second plurality of successive lane change indications during the wait period, wherein each of the second plurality of successive lane change indications indicates whether the autonomous vehicle should remain in the first lane or move from the first lane to the second lane; and
causing, using the at least one processor, the autonomous vehicle to move from the first lane to the second lane based on the second plurality of successive lane change indications, wherein causing the autonomous vehicle to move from the first lane to the second lane comprises causing the autonomous vehicle to remain in a first lane for a threshold time period.

14. The method of claim 13 further comprising: generating a plurality of trajectories based on first scene data;
selecting a first trajectory of the plurality of trajectories; and
generating a lane change indication based on the first trajectory, wherein the lane change indication is one of the lane change indications of the first plurality of successive lane change indications, wherein each of the first plurality of successive lane change indications corresponds to a respective trajectory generated from respective scene data.

15. The method of claim 13, wherein obtaining a first plurality of successive lane change indications comprises obtaining a first plurality of successive lane change indications, wherein each successive lane change indication of the first plurality of successive lane change indications is generated at a different time step.

16. The method of claim 13, wherein determining to cause the autonomous vehicle to move from the first lane to the second lane comprises determining to cause the autonomous vehicle to move from the first lane to the second lane based on a determination that a threshold quantity of the first plurality of successive lane change indications and the second plurality of successive lane change indications indicate that the autonomous vehicle should move from the first lane to a second lane of the scene.

17. The method of claim 13, further comprising:
generating a plurality of trajectories from first scene data;
selecting a first trajectory of the plurality of trajectories;

generating a lane change indication of the second plurality of successive lane change indications based on the first trajectory,
wherein each of the second plurality of successive lane change indications correspond to a respective trajectory generated from respective scene data.

18. The method of claim 13, wherein causing the autonomous vehicle to move from the first lane to the second lane comprises causing the autonomous vehicle to move from the first lane to the second lane based on a determination that a threshold quantity of the second plurality of successive lane change indications indicate that the autonomous vehicle should move from the first lane to a second lane of the scene.

19. The method of claim 13, wherein causing the autonomous vehicle to move from the first lane to the second lane based on the second plurality of successive lane change indications comprises causing the autonomous vehicle to move from the first lane to the second lane based on the second plurality of successive lane change indications and at least one lane change indication of the first plurality of successive lane change indications.

* * * * *